United States Patent
Best et al.

(10) Patent No.: US 6,265,593 B1
(45) Date of Patent: Jul. 24, 2001

(54) PROCESS FOR SOLVENT EXTRACTION OF HYDROPHOBIC COMPOUNDS

(75) Inventors: Bernd Best, Möfelden-Walldorf; Katja Hegwein, Reinheim/Odenwald; Rainer Frische, Frankfurt am Main; Barbara Olbrich-Deussner, Darmstadt; Joachim Seemann, Reinheim/Odenwald, all of (DE)

(73) Assignee: Dr. Frische GmbH, Alzenau (DE)

( * ) Notice: Subject to any disclaimer, the term of this patent is extended or adjusted under 35 U.S.C. 154(b) by 0 days.

(21) Appl. No.: 09/266,516

(22) Filed: Mar. 11, 1999

(30) Foreign Application Priority Data

Mar. 13, 1998  (EP) ................................... 98104591

(51) Int. Cl.$^7$ ....................................... C11B 1/00
(52) U.S. Cl. .................................. 554/12; 13/14; 13/20; 13/21; 13/22
(58) Field of Search ................................. 554/12, 13, 20, 554/21, 14, 22

(56) References Cited

U.S. PATENT DOCUMENTS

| 2,875,061 | 2/1959 | Vogel et al. ................................. 99/7 |
| 3,565,634 | 2/1971 | Österman ................................. 99/18 |
| 5,525,260 | * 6/1996 | Aeschbach et al. ................. 252/398 |

FOREIGN PATENT DOCUMENTS

| 19529795 A1 | 2/1996 | (DE) | ................................. C11B/1/00 |
| 0 038 959 A1 | 4/1981 | (EP) | ................................. C09K/15/34 |
| 0038959 | * 4/1981 | (EP) | ................................. C09K/15/34 |
| 2 316 323 | 1/1977 | (FR) | ................................. C11B/9/02 |

* cited by examiner

Primary Examiner—Johann Richter
Assistant Examiner—Diedra Faulkner
(74) Attorney, Agent, or Firm—Quarles & Brady LLP

(57) ABSTRACT

A process is disclosed for extracting hydrophobic compounds from substantially fat-, oil-, and wax-free substance mixtures by using at least one non-polar extraction solvent in conjunction with at least one water-soluble organic solvent wherein the extraction solvent containing the hydrophobic compound can be recovered as the upper phase in a phase separation.

14 Claims, No Drawings

PROCESS FOR SOLVENT EXTRACTION OF HYDROPHOBIC COMPOUNDS

CROSS-REFERENCE TO RELATED APPLICATIONS

Applicant claims priority to EP Patent 98104591.7

STATEMENT REGARDING FEDERALLY SPONSORED RESEARCH AND DEVELOPMENT

Not applicable.

BACKGROUND OF THE INVENTION

It has been known for a long time that hydrophobic compounds are extractable from finely comminuted dry substance mixtures with nonpolar solvents, e.g., aliphatic hydrocarbons such as hexane, vegetable oils or fatty acid esters of long-chain fatty acids such as stearic acid methyl ester. Use is made thereof, in particular, in the production of hydrophobic substances such as dyes from native materials.

It has also been known that vegetable oils, e.g., from oil seed meals may be extracted with hexane as the extraction agent. Correspondingly, the determination of the residual oil contents of de-oiled seed oil meals by means of lightly volatile hydrocarbons such as hexane in a Soxhlet apparatus proved successful. In this way it is equally possible to determine in a simple way and within a short time the residual cocoa butter contents in commercial dry and de-oiled cocoa powder by means of Soxhlet extraction.

Those versed in the art are aware that such extractions can successfully be performed only if water is carefully separated from the substance mixtures (here oil seed meals and the cocoa) prior to the solvent extraction. As soon as the mixture includes a humidity content exceeding the small water amounts absorptively drawn by the solid from the ambient air, such extractions of hydrophobic compounds with nonpolar solvents are hardly possible. In the case of the addition of water quantities to dry cocoa powder which quantities are still completely absorbed by it without destroying the powder structure, for instance, extraction of the residual cocoa butter content is no longer possible. This applies for instance also for carrots and other substantially fat-free native substances such as red pepper pods, from which dyes not bound to oil, fats or waxes can successfully be extracted with oils or for instance also with hexane only if and when the starting quantity has sufficiently been predried. As commonly known, such drying is not only complicated but causes frequently losses by thermal or oxidative decomposition even when taking respective precautionary measures.

As compared thereto, extractions in the presence of water are possible if more polar components which while hardly being soluble in water are extracted with more polar extraction solvents not miscible with water which however easily solve these components (e.g., esters of short-chain alkyl alcohols with short-chain carboxylic acids). The substances to be extracted as well as the solvents are, as a rule, compounds which in the chemical structure include both polar and nonpolar structural features and where the nonpolar structural features are not very dominant. In these cases, the presence of humidity or water has no extraction preventing effect. Penicillin for instance may rapidly be extracted with a high yield with butyl acetate from aqueous acidic fermentation broth. In principle, it is of course possible to simultaneously extract by means of such an extraction solvent including both polar and nonpolar structural features also a strongly hydrophobic or, in other words, nonpolar component in the presence of water as well. In this case, however, extraction is not selective and more polar components are inevitably extracted as well. This refers particularly to native substances since they always include a broad spectrum of differently polar components (from strongly nonpolar to strongly polar). The above-described prior art describes processes wherein, by means of a nonpolar extraction solvent of the kind referred to and graded in the literature as non-soluble in water, especially strongly hydrophobic components having strongly dominating nonpolar structural features can selectively be extracted.

In practice, however, there exists very frequently the problem of isolation of small quantities of such very hydrophobic compounds from water-containing substance mixtures. In case of isolation of biologically active strongly hydrophobic effective substances from vegetable or animal material, these are metabolites (such as $\beta$-carotin) of living organisms which very often are sensitive to the influence of heat and air. It is exactly here where the drying measures hitherto required constitute a considerable disadvantage.

In common fat extractions, in particular also for the determination of residual oil contents, devices are employed which operate comparable to the Soxhlet apparatus and which commonly pass the extraction solvent in a continuous process and in large quantities through the raw material. The solvent loaded with the substance to be extracted is then separated by distillation, freeze-drying or other suitable measures from the dissolved substance. In addition, it is possible in principle to mix the extraction solvent with the finely comminuted raw material and to press off or filter off the extraction solvent or to expose the mixture to a centrifugal field after the malaxing process so that a solid phase and a liquid phase of the solvent loaded with the extracted substances is formed. Such procedure has for instance been revealed in the abstract of JP3020397(Database WPI, Week 9110, Derwent Publ. Ltd., AN 91-070562), where for the production of fish oil from comminuted fish, the extraction solvents n- or i-propanol are used and the extraction solvent with the extracted lipids is selectively filtered off or centrifuged off from the solids. U.S. Pat. No. 2,875,061 discloses to subject a water-containing fish mush having a fat content of more than 4%, prior to dehydration, hydrolysis, and deodorization, to a solid-liquid fat extraction with a non water-miscible organic solvent such as benzene, methylene chloride or trichloroethylene. These solvents are somewhat water-soluble, though. In addition, these solvents as known dissolve most of the fats well and act in a way as to extract other accompanying substances as well so that the selective effect mentioned above cannot be achieved. This is in the case of the separation of fish oil from fish less significant since referred to the fish oil the proportion of that having extracted accompanying substances amounts to only from a few parts per thousand to a few percent maximum. In U.S. Pat. No. 3,565,634, fat is extracted in a special apparatus from fish meal under the addition of water and a fat solvent not explicitly defined, wherein in a way known per se the extraction phase obtained in a counter current or counter flow extraction apparatus is freed from the solvent in a screw centrifuge and a subsequent counter current evaporator.

Since it has been known as already mentioned above that for extractions in general and also for fat extractions huge quantities of extraction solvents are required, it is recommended, particular for the production of oils, fats or waxes from respective native oil, fat or wax containing starting substances in a high yield, as an alternative to an extraction process, a purely physical separation process as has for instance been disclosed in DE 195 29 795 A1 (corresponds to co-pending U.S. application Ser. No. 08/793,082, assigned to the assignee of the present invention). In accordance with this process, it is possible to centrifuge off for instance oils as a second liquid phase without employing an extraction solvent just through one single centrifuging step in the presence of water and a water-soluble organic solvent (preferably in the form of an alcohol not acting in the present case as extraction agent). The first liquid phase is formed by the alcoholic water phase lying under the oil phase, which water phase is also clearly separated from the simultaneously-formed solid phase of the developing solid-liquid-liquid three-phase system. The alcohol acts here as a kind of displacing means and avoids the formation of an otherwise inevitable emulsion layer between aqueous phase and oil phase. Together with the water in which it is well soluble the alcohol provides that the three phases, particularly the two liquid phases develop based on their density difference in the centrifugal field with a clean phase boundary. If the density difference between the two liquid phases cannot be easily adjusted alone with the water-soluble solvent, or the alcohol, respectively, then DE 195 29 795 A1 suggests to add non water-soluble light solvents such as hexane or acids and salts which will provide for the required shift of the density conditions. In DE 195 29 795 A1, the process was performed with or without the addition of hexane, particularly in connection with linseed in order to obtain linseed oil. In both cases, yields could be obtained which were substantially in the same range. The added quantities of water soluble alcohol to obtain the density differences in the centrifugal process are small compared to the required quantities of an oil-extracting solvent in an alternative oil solvent-extraction process. In addition, the centrifugal process may be performed with only one centrifugal step rapidly and with a high yield and short malaxing times. In this case, however, oil, fat or wax containing starting materials such as oil fruits are a prerequisite, and in the separated oil phase only the oil-soluble components of the upper floating or supernatant oil phase can be separated which go into the oil during their generation in the biological growth process and hence were already solved in the oil prior to the separation through the centrifugal process. Basically, in such a centrifugal process only such components of a supernatant phase can be separated that are present in a liquid phase.

In contrast, the inventors of the present invention had to solve the problem of finding a most efficient solvent extraction process which makes possible the successful selective extraction of especially strongly hydrophobic compounds which are present in solid form, from substance mixtures by means of nonpolar solvents where the substance mixtures may be water-containing and need not be pre-dried. The above-described disadvantages and limitations of the prior art are avoided by the present invention.

BRIEF SUMMARY OF THE INVENTION

The present invention provides a process for solvent extraction of hydrophobic compounds comprising an a priori substantially fat-, oil- and wax-free or a strongly degreased, de-oiled or de-waxed comminuted substance mixture by means of one, or a plurality of, nonpolar extraction solvent (s) selectively solving said hydrophobic compounds, wherein said substance mixture depending on its dry matter content, if necessary by adding water prior to, or after, said comminutation, is worked into a kneadable mass or mush having a water content of not less than about 40% by weight of the weight of the substance mixture inclusive of the water added if necessary, a water-soluble organic solvent and said extraction solvent(s) are worked into said substance mixture or said mass or said mush, respectively, the amount of said water-soluble organic solvent is chosen depending on the water content of the mass or the mush, in a range from about 15% per weight to about 65% by weight of the aqueous phase containing said water-soluble organic solvent and, the amount of said extraction solvent(s) is chosen depending on the content of hydrophobic compounds in the substance mixture, in a range between about 10% by volume and preferably 100% by volume of the volume of the aqueous mass, or the aqueous mush, respectively, inclusive of the organic solvent, and said mass, or said mush, respectively, after malaxing, is separated in a centrifugal field in one step into a solid sediment, an aqueous phase containing the water-soluble organic solvent, and an extraction solvent phase which is separated from the aqueous phase by a clear phase boundary and forms the upper phase of the a phase picture obtained after said one-step centrifugation, said extraction solvent phase being of comparatively low density with the hydrophobic compounds solved therein.

DETAILED DESCRIPTION OF THE INVENTION

Experiments performed by the inventors to extract for instance the β-carotin from non-dried carrots with oil or hexane as extraction solvent proved very insufficient even in case of finest milling and long malaxing times. This was independent on whether the separation of the liquid extraction phase after malaxing was performed by pressing, filtering or centrifuging. In each case it was obviously the water present which caused that the extraction solvent could not get into contact with the components to be extracted.

Surprisingly, the inventors have found out that successful dissolution of the components to be extracted in the extraction solvent was possible in spite of the water content if and when a water-soluble alcohol such as methanol was added. Why such addition suppresses the otherwise negative effect of the water content on the extraction could not be clarified. The positive effect, however, could now regularly be used for various starting mixtures of carrots, red pepper pods, tomatoes and the like where successful extraction without drying, for instance of dyes, was now possible with the extraction solvent oil. Water soluble alcohol obviously generates conditions which render the strongly hydrophobic substance to be isolated or separated accessible for the nonpolar extraction solvent such as vegetable oil or aliphatic hydrocarbon. It is only this which makes possible a "solving out" and separating of the substance to be isolated from the solids in the mush and the separation of the substance together with the extraction solvent, or oil, respectively. The oil employed in accordance with the invention consists always of triglycerides obtainable from native substances, i.e. so-called native oils.

In this connection, it was also surprising that the water-soluble alcohol contained in the aqueous mush or the kneadable material according to the present invention and hence also, at a certain percentage, in the extraction solvents did not lower the solving power of these nonpolar extraction solvents for the nonpolar compounds to be solved, as one versed in the art would have expected.

In addition, the significant advantage not to be expected for efficient process execution was that the quantity of the water-soluble alcohol to be added could be set in a range wherein it was possible to separate the added oil with the dyes extracted from the starting mixture and solved in the oil in one single centrifuging step as the upper liquid phase above a phase containing the water-soluble alcohol and a solid phase with a clean phase boundary between the two liquid phases. The presence of water, further on, was not only harmless, it was even possible to additionally add substantial amounts of water.

A comparable result with such a phase picture after centrifugal action, comprising two distinct liquid phases and a solid phase was already described, as referred to above, in DE 195 29 795 A1. In this case, however, the oil was a constituent of the native starting mixture and not an added extraction solvent used in order to selectively separate solids not bound to an oil from practically oil-free starting mixtures. Insofar it was also surprising that for obtaining this phase picture as a result of the centrifugal action it is obviously irrelevant whether the oil is embedded in the starting substance mixture or is added as extraction means to a substantially oil-free starting mixture. By substantially oil-, fat- or wax-free mixtures, we mean such mixtures that have a content of oils, waxes or fats of no more than about 10% w/w, preferably no more than about 3% w/w, and most preferably no more than about 1% w/w. For example, in the case of carrots, tomatoes or pepper pods, the content of oils, waxes, or fats is typically less than 0.5% w/w. Such substantially oil-, fat-, or wax-free mixtures can also include substances which have been strongly degreased, de-oiled, or de-waxed.

Further experiments, for instance with the carrots, revealed that, alternatively to native oil, aliphatic hydrocarbons such as hexane can be employed and then, after one single centrifugal step, a corresponding upper hexane dye phase may be obtained. Under aliphatic hydrocarbons, highly volatile hydrocarbons common according to the state of the art for oil extractions are understood which vaporize without any residue. Under hexane, correspondingly, a chemically not pure hexane is understood which is usually used for extraction purposes.

Finally, experiments were also performed with heavily de-oiled starting mixtures, such as cocoa powder (about 8% w/w cocoa butter) which, as has been mentioned above, could heretofore be freed by extraction with hexane or also oil only in dry form from the residual cocoa butter. Also in this case, the process of the invention offers a progress in that it makes possible efficient extraction also of very minute residual quantities of liquid hydrophobic compounds in the centrifuging process.

As has already been mentioned in the problem underlying the invention, the invention is of particular significance for solvent extraction of strongly nonpolar hydrophobic solid compounds which are intimately (for instance absorptively and/or adsorptively) compounded or bound with moderately polar non water-soluble main components, such as fat-soluble vitamins, provitamins and dyes which are extracted from aqueous non oil-, fat- or wax-containing starting mixtures. A further advantage offered is the possibility to successively draw or transfer for instance vitamin E in one step into the extraction solvent vegetable oil and to use it after removing small alcohol proportions dissolved in the oil without any further treatment directly for instance as food or fodder addition or as active substance for pharmaceuticals or cosmetics. Heretofore the vitamin or an other active substance was frequently first isolated and then brought together with vegetable oil.

By the addition of water soluble alcohol, a two-fold positive effect could in all cases be obtained, namely that, first, the water as present can no longer prevent access of the extraction solvent to the hydrophobic compounds to be extracted and that, second, the extraction phase may be separated by centrifuging in one step from the remaining liquid constituents as the subjacent second liquid phase lying under the extraction phase.

A further positive effect of the invention is its practicability at low temperatures. Freezing point depression effected by alcohol addition for instance permits extraction even in case of temperatures below the freezing point of water. In this way, also extremely sensitive components may gently be extracted. Such low temperatures cannot be obtained with other extraction techniques because of the natural water content of the starting materials.

If comminutation of the native substance is performed in the presence of water, an effective medium for cooling, or carrying off, respectively, the heat generated by the comminution is at the same time available. This is not possible in case of starting materials pre-dried as in the case of common extraction. In addition, the water which may, if necessary, have been degassed beforehand, protects the substance mixture deprived by the comminution of its biological oxidation protection from the detrimental effect of oxygen.

The alcohol contained in the aqueous mush acts biocidal and thus protects the components to be extracted from microbial breakdown.

Instead of a water-soluble alcohol, an other water-soluble organic solvent, such as acetone, may for instance be added. Water-soluble alcohols (such as methanol, ethanol, n-propanol, and isopropanol), however, are preferred.

The present invention defines ranges wherein the respective additions are made. For each starting substance and the selected extraction solvent which, with a view to the amount of the hydrophobic compound to be solved and separated from the starting substance mixture is apportioned in the manner principally known per se, optimum additional amounts for alcohol and water can, with a view to a maximum yield, empirically simply be found beforehand based on the resulting phase picture of the centrifugal step. From DE 195 29 795 A1 furthermore it is possible to take the basic mechanisms and conditions for the centrifugal step, the respective density conditions to be adjusted and the possible concentration ranges for the water and the water-soluble organic solvent, or water-soluble alcohol, respectively, to be used. Thus depending on the dry matter content of a water containing starting material, further water is added with a view to the phase picture resulting from the centrifugal step to be obtained and the density of the developing aqueous phase as compared to the upper phase containing the extraction agent and having a smaller density. In principle, the upper limit of the quantity of water-soluble solvent (or preferably the water-soluble alcohol, respectively) is preferably set, as a rule, to about 50% by weight relative to the aqueous phase contained in the processed mush. In principle, however, an addition of water-soluble organic solvent of up to about 65% by weight is possible. The corresponding lower limit is preferably 20% by weight. In principle, values down to 15% by weight are possible. When working in the range for the water-soluble organic solvent defined in the present invention, this has also the above-described advantageous effect with a view to the extraction which in the presence of water is otherwise not, or only insufficiently, possible.

In principle, any order of adding the substances mentioned in the present invention is possible, i.e. the solvents, or the water, respectively, may also simultaneously be added to the starting material mixture or, if desired, successively be included into the mush to be produced or into the kneadable material, respectively.

An acceptable comminuting or milling degree may also be found in a simple way by referring to the phase picture after centrifugal action. In principle, it is of course favorable to comminute as finely as possible. So far, a material milled by means of a conundrum wheel has proved to be fine enough. Other finely comminuting mills, such as perforated disk, toothed disk or ball mills are suitable as well. Considering the various starting materials, a basically valid statement however can hardly be made. Particularly when working with "wet" products, such as tomatoes, carrots and the like, other mechanical comminuting devices, by the way, such as rotating knives, proved very successful as well.

The above-described and other advantageous further developments of the present invention solving the problem as specified are defined in the appended claims.

In the following, a possible principal procedure according to the invention including evaluation criteria and possible subsequent steps will be explained.

1. The water-containing starting material to be subjected to extraction is either directly or, if the dry matter content of the starting material is too high (larger than about 60% by weight relative to the weight of the starting material) after the addition of water finestly comminuted to a kneadable material or a mush. In other words, the water content should, if possible, not be below 40% by weight. The aqueous mush, depending on the starting material, should preferably have between about 50% by weight (in case of starting materials having small water binding capability) and about 80% by weight (in case of starting materials having strong water binding capability) of water relative to the total amount of the mush containing the water and the starting material. In other words, the work is preferably performed with a ratio of dry matter to water between about 1/1 and 1/4. In fact, a number of starting substances was treated according to the process of the invention, which have already a water content of more than 90% by weight (such as tomatoes or red pepper pods) even without the addition of water. Such high water content was not disturbing. This is why the present invention provides only a lower limit for the water content is given. From a rational point of view, the above limit of 80% by weight as referred to is maintained if water has to be added and it has also proved as sufficient in case of materials having a high water binding capability. As will be explained below, a person versed in the art, as for the rest, may empirically find the respective optimum range in a rapid way by reference to the phase picture obtained after centrifugal action.

2. To the starting product or the mush or the kneadable mass, respectively, is added water-soluble alcohol in an amount of, as a rule, 15% by weight to about 65% by weight, preferably 20% by weight to 50% by weight, of the aqueous phase consisting of substantially the total water content of the mass plus water-soluble alcohol (or water-soluble organic solvent, respectively) present in the mush or the mass, respectively.

3. Simultaneously with the water, subsequently to or prior thereto, the extraction solvent (or an extraction solvent mixture of oil and hexane, ester of long-chain fatty acids with monovalent alcohols and ether), for instance in the form of hexane or a vegetable oil are worked in taking the content of the compounds to be extracted in consideration. With relation to the volume of the water- and alcohol-containing mush, preferably between about 10% by volume and 100% by volume of extraction solvent are added. The upper limit need not necessarily be obeyed, it constitutes rather a technically significant limit preferably to be obeyed resulting simply from the rational point of view not to work with unnecessarily high extraction solvent amounts which are technically difficult to handle. Preferred long chain fatty acid esters are those in which the sum of the carbon atoms in the fatty acid chain moiety and in the alcohol moiety is greater than 8.

4. The mixture so obtained is slowly stirred (malaxed) between about 15 minutes and one hour and, depending on the extraction task given, a temperature between −10° C. and 100° C. is set. The low lower limit of −10° C. is possible in spite of the water content because of the alcohol addition according to the invention. At these low temperatures, also very sensitive components may with preference be extracted with extraction solvents staying liquid at these temperatures. Unless correspondingly sensitive components are concerned, processing is preferably done at a temperature range of between 20° C. and 80° C.

5. After malaxing, the mass is forcibly centrifuged (preferably with more than 1000 g). The mush then separates in the centrifugal field into a solid sediment compactly depositing from the aqueous liquid phase, the liquid phase slightly exceeding the aqueous liquid phase and thereupon an extraction solvent phase with the upper extracted substance. In the experiments, a laboratory centrifuge of the type Minifuge GL by Heraeus (Osterode, Germany) was for instance used.

In case of optimum adjustment of the substance system, practically the complete extraction solvent phase is swimming on an aqueous phase containing the water-soluble organic solvent whereby, between the two liquid phases, a "clean phase boundary" is developed. The solids not extracted will deposit from the liquid phase as a compact sediment. Deviations from this optimum may be noted by the following phenomena:

1. No solid-free liquid phase is formed:
The content of the system of aqueous phase is too small. Water and alcohol have to be added.

2. Between aqueous phase and extraction solvent phase, there is an emulsion layer:
The aqueous phase contains too little alcohol.

3. In the aqueous phase, extraction solvent drops are swimming:
The alcohol concentration in the aqueous phase is too high.

4. The supernatant or upper extraction solvent phase is too small relative to the amount of extraction solvent used:
Malaxing was not long enough, the comminuting or milling degree is not sufficient or the alcohol content in the aqueous phase is too low.

Starting from the separation conditions found in the laboratory with the content ratios defined in the present invention, the separation problem may be transferred to large-scale production. For a continuous centrifugal seperation of the extraction phase consisting of extraction solvent and extracted component, decanting centrifuges and separator centrifuges, for instance of the types CA365 or SC20 by Westfalia Separator (Oelde, Germany), are suitable.

When using easily boiling extraction solvents such as hexane, they can be distilled off and returned into the process. The extracted component then remains as a residue and may be processed in a conventional manner.

The extracted component may also obtained in that the extraction phase is cooled down so that the extracted product is no longer soluble in the extraction solvent and hence precipitates as a solid. Such freezing-out process will be chosen for components the solubility of which in the extraction solvent heavily depends on the temperature and the precipitation speed of which is high. The extraction solvent loaded with residues may in this case be recirculated in the extraction process without distillation.

The extraction process described can, furtheron, repeatedly be applied. The procedure provides that the solids obtained after each centrifugal step and the aqueous phase, after separation of the upper extraction phase (e.g., oil or hexane phase), are treated again in accordance with the invention by adding again extraction solvent. The following examples will explain the invention in more detail.

EXAMPLE 1
Extraction of Dyes from Carrots with Sunflower Oil a) 300 g carrots were crushed by means of a household machine to a mush. The estimated water content of the carrots was about 88% by weight. 279 g of the carrot mush, 55.8 g of commercially available, almost colorless, sunflower oil and 126 g of isopropanol were put into a closable centrifuge glass and intensively mixed. Subsequently the mass was left standing for 15 minutes at room temperature. Finally centrifuging was performed for 5 minutes at 5000 rpm in a laboratory centrifuge. A deep-red oil phase was developed which, separated by a "clean" phase boundary, stood above a yellowish isopropanol/water phase. On the bottom of the centrifuge glass, there was a compact slightly orange solid phase.

The oil phase was separated in the conventional way. The residue consisting of aqueous and solid phase was finally added 8 g fresh sunflower oil, mixed by shaking, incubated for 15 minutes at room temperature and centrifuged. The new oil phase so obtained was of distinctly slighter color as compared to the first oil phase. This showed that the dye was essentially separated in the first extraction step already.

b) (Comparative Example): 300 g carrots were finely crushed by means of a household machine to a mush. 279 g of the carrot mush and 55.8 g of commercially available, almost colorless, sunflower oil were put into a closable centrifuge glass and intensively mixed. Subsequently it was left standing for 15 minutes at room temperature. Finally centrifuging was performed for 5 minutes at 5000 rpm in a laboratory centrifuge.

No separation into different phases could be obtained. Merely some oil drops, as compared to (a), being notably lighter-red colored were visible at the surface of the centrifuged mass in the centrifuge glass.

EXAMPLE 2
Extraction of Dyes from Tomatoes with Sunflower Oil a) 250 g tomatoes were crushed in a household machine as in Example 1. The estimated water content of the tomatoes was 94% by weight. 200 g of the tomato mush with added 30 g of commercially available, almost colorless, sunflower oil and 94 g isopropanol were mixed for 30 minutes at 70° C. in a closed vessel. Subsequently, the mush was transferred into a centrifuge glass and centrifuged for 5 minutes at 5000 rpm. After centrifuging, separation into three phases clearly separated from each other was observed: On a compact, slightly pink colored sediment, there stood a slightly yellowish isopropanol/water phase and thereupon a brown slightly cloudy oil phase. The oil phase was separated and weighed. 30 g raw oil were reclaimed. After drying, the now-clear oil was examined in UV light where it showed a significant greenish-orange fluorescence. In addition to the evaluation of color differences at day light, the observation of fluorescence under UV light gives additional indications to the enrichment of substances in the extraction solvent.

b) (Comparative Example). 250 g tomatoes were crushed by means of a household machine as in Example 1. 200 g of the tomato mush with added 30 g of commercially available, almost colorless, sunflower oil were mixed for 30 minutes at 70° C. in a closed vessel. Subsequently the mush was transferred into a centrifuge glass and centrifuged for 5 minutes at 5000 rpm.

By centrifuging, a good separation was not obtained. On a loose pink colored sediment, there stood a whitish cloudy phase which changed via an extended emulsion area into an upper orange colored oil phase. Because of the poor phase separation, the oil phase could not be separated in pure form but only together with some water. Nevertheless, the yield of this very "wet" oil amounted to only 25 g. The dried clear oil showed no fluorescence.

EXAMPLE 3
Extraction of Components from Garlic with Sunflower Oil

To 94.3 g garlic cloves (estimated water content: 70% by weight) with the skin substantially peeled off was added 18.9 g of commercially, available almost, colorless sunflower oil. The mixture was crushed by means of a household machine as in Example 1. 40.0 g of this mush was filled into a closable centrifuge glass. 11.7 g isopropanol was added. The preparation was intimately stirred with a spatula, subsequently maintained for 15 minutes at 70° C. and subsequently centrifuged for 5 minutes at 4000 rpm.

A clear separation into three phases could be observed: Above a white solid phase, there stood a milky-yellow aqueous phase which on its part was separated by a clear phase boundary from an oil phase. 5.1 g of a brilliantly yellow oil that had an intensive garlic smell could be isolated.

EXAMPLE 4
Extraction of Hydrophobic Components from Onions with Sunflower Oil 920 g peeled onions were crushed by means of a household juice extractor. Juice and juice-extracted residue were united. The water content of the onions was estimated at 90% by weight. To the mush was added 415 g isopropanol and 183 g of commercial, almost colorless, sunflower oil. The mixture so obtained was stirred with a laboratory stirrer for 30 minutes at 70° C. in a two-neck flask with backflow cooler. After transferring the mixture into a closable centrifuge glass, centrifuging was performed for 5 minutes at 3500 rpm in a cup centrifuge of the type Megafuge 3.0 R by Heraeus (Osterode, Germany).

A gold-yellow oil phase was developed which, separated by a "clear" phase boundary stood above a whitish-cloudy isopropanol/water phase. On the bottom of the centrifuge glass, there was a compact whitish solid phase.

The oil phase was separated by a separating funnel. The gold-yellow oil had a distinct onion smell.

EXAMPLE 5
Extraction of Hydrophobic Color and Aroma Substances from Basil with Sunflower Oil To 300 g fresh basil (leaves, flowers, thinner stems) having an estimated water content of 90% by weight were added 60 g of a commercially available, almost colorless, sunflower oil and 135 g isopropanol. The mixture was finely comminuted by means of a household pureeing device. The mush so obtained was stirred with a laboratory stirrer for 30 minutes at 70° C. in a two-neck flask with backflow cooler. After transferring the mixture into a closable centrifuge glass centrifuging was performed for 5 minutes at 5000 rpm in a cup centrifuge of the type Minifuge Gl by Heraeus (Osterode, Germany).

A deep green, red-fluorescent oil phase was developed which separated by a clear phase boundary stood above a greenish isopropanol/water phase. On the bottom of the centrifuge glass, there was a compact greenish solid phase.

The oil phase was separated in a conventional way by a separating funnel. 44.8 g of a deep-green oil having an intensive basil aroma were obtained.

EXAMPLE 6

Extraction of Hydrophobic Components of Pepper Pods with Sunflower Oil 795 g red pepper pods (without kernels and stems) having an estimated water content of 95% by weight were crushed by means of a meat grinder and subsequently finely comminuted by means of a laboratory comminuting device Ultra Turrax T 25 by IKA (Staufen, Germany). To the mush was added 159 g of a commercially available, almost colorless, sunflower oil. The mixture was intensively mixed by means of a household pureeing device. The mixture so obtained was stirred with a laboratory stirrer together with 378 g isopropanol for 30 minutes at 70° C. in a two-neck flask with backflow cooler. After transferring the mixture into a closable centrifuge cup, centrifuging was performed for 5 minutes at 3500 rpm in a cup centrifuge of the type Megafuge 3.0 R by Heraeus (Osterode, Germany).

A dark-orange oil phase was developed which separated by a clear phase boundary stood above a light-orange isopropanol/water phase. On the bottom of the centrifuge glass, there was a compact pale-orange solid phase.

The oil phase was separated in a conventional way by a separating funnel.

EXAMPLE 7

Extraction of Hydrophobic Components from Pepper Pods with Hexane 460 g red pepper pods (without kernels and stems) having an estimated water content of 95% by weight were finely comminuted by means of a household pureeing device. To the mush was added 220 g isopropanol and 100 g hexane (hexane fraction, Fluka company, Switzerland). The mixture so obtained was stirred with a laboratory stirrer for 30 minutes at 50° C. in a two-neck flask with backflow cooler. After transferring the mixture into a closable centrifuge cup centrifuging was performed for 5 minutes at 5000 rpm in a cup centrifuge of the type Minifuge GL by Heraeus (Osterode, Germany).

A dark-orange hydrophobic upper phase was developed which separated by a clear phase boundary stood above a light-orange aqueous-alcoholic phase. On the bottom of the centrifuge glass, there was a compact pale-orange solid phase.

The upper phase was separated in a conventional way by means of a separating funnel. The separated upper phase was subsequently concentrated under recovery of the hexane with a rotary vaporizer. Obtained were 1.1 g of a highly viscous, deep-orange liquid.

It should be noted that while the above examples are directed to the extraction of hydrophobic compounds from the preferred native substance mixtures, it should be understood that the present invention can also be advantageously employed to extract hydrophobic compounds from animal-derived substance mixtures. Accordingly, the claimed invention encompasses such animal-derived substance mixtures.

What is claimed is:

1. A process for solvent extraction of hydrophobic compounds from a substantially fat-, oil- and wax-free comminuted substance mixture by means of at least one nonpolar extraction solvent selectively solving and extracting the said hydrophobic compounds, comprising:

working said substance mixture, and optionally adding water prior to, or after, said comminutation depending on the dry matter content of said substance mixture, into a kneadable mass having a water content of not less than about 40% by weight of the weight of the substance mixture inclusive of the optional water added, working a water-soluble organic solvent and said at least one extraction solvent into said substance mixture or said mass, the amount of said water-soluble organic solvent being chosen depending on the water content of the mass, in a range from about 15% per weight to about 65% by weight of the aqueous phase containing said water-soluble organic solvent and, the amount of said at least one extraction solvent being chosen depending on the content of hydrophobic compounds in the substance mixture, in a range between about 10% by volume and preferably 100% by volume of the volume of the aqueous mass, inclusive of the water-soluble organic solvent, and separating said mass, after malaxing, in a centrifugal field in one step into a solid sediment, an aqueous phase containing the water-soluble organic solvent, and an extraction solvent phase which is separated from the aqueous phase by a clear phase boundary and forms the upper phase of the a phase picture obtained after said one-step centrifugation, said extraction solvent phase having a lower density than the aqueous phase containing the water-soluble organic solvent.

2. A process according to claim 1, wherein said hydrophobic compounds are solids which are not dissolved in oils, fats or waxes in the substance mixture.

3. A process according to claim 1, wherein said substance mixture comprises native substance mixtures.

4. A process according to claim 3, wherein said native substance mixture contains water.

5. A process according to claim 4, wherein said native substance mixture is selected from the group consisting of carrots containing the hydrophobic compound β-carotin, tomatoes containing the hydrophobic compound lycopin, and grape skins containing the hydrophobic compounds flavonoids and other phenolic antioxidants.

6. A process according to claim 1, wherein the substance mixture comprises strongly de-oiled cocoa powder containing the residues of the hydrophobic substance cocoa butter.

7. A process according to claim 1 wherein said nonpolar solvents comprise oils.

8. A process according to claim 1 wherein said nonpolar solvents comprise fatty acid esters wherein the sum of the carbon atoms of the fatty acid moiety and of the alcohol moiety is greater than 8.

9. A process according to claim 1 wherein said nonpolar solvents comprise aliphatic hydrocarbons.

10. A process according to claim 9 wherein said aliphatic hydrocarbons are hexane.

11. A process according to claim 1 wherein said water-soluble organic solvent is at least one water-soluble alcohol.

12. A process according to claim 11, wherein the water-soluble alcohol is at least one of methanol, ethanol, n-propanol or isopropanol.

13. A process according to claim 1 wherein the optimum amounts of water and water-soluble solvent are empirically found beforehand based on the condition of the resulting phase picture to be obtained in the centrifuge process step.

14. A process according to claim 1 wherein between about 20% by weight and 50% by weight of the water-soluble organic solvent are worked into the substance mixture.

* * * * *